US009641852B2

(12) United States Patent
Lu et al.

(10) Patent No.: US 9,641,852 B2
(45) Date of Patent: May 2, 2017

(54) COMPLEXITY SCALABLE MULTILAYER VIDEO CODING

(71) Applicant: Dolby Laboratories Licensing Corporation, San Francisco, CA (US)

(72) Inventors: Taoran Lu, Santa Clara, CA (US); Peng Yin, Ithaca, NY (US); Yuwen He, San Diego, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/960,295

(22) Filed: Dec. 4, 2015

(65) Prior Publication Data

US 2016/0088304 A1   Mar. 24, 2016

Related U.S. Application Data

(63) Continuation of application No. 13/847,022, filed on Mar. 19, 2013, now Pat. No. 9,247,246.
(Continued)

(51) Int. Cl.
*H04N 19/176* (2014.01)
*H04N 19/187* (2014.01)
(Continued)

(52) U.S. Cl.
CPC ......... *H04N 19/187* (2014.11); *H04N 19/103* (2014.11); *H04N 19/156* (2014.11);
(Continued)

(58) Field of Classification Search
CPC ...... H04N 19/30; H04N 19/187; H04N 19/33; H04N 19/70; H04N 19/176; H04N 19/105; H04N 19/61; H04N 19/117; H04N 19/597
See application file for complete search history.

(56) References Cited

U.S. PATENT DOCUMENTS

| 7,724,827 | B2 | 5/2010 | Liang et al. |
| 8,116,376 | B2 * | 2/2012 | Boyce .................. H04N 19/61 375/240.16 |

(Continued)

FOREIGN PATENT DOCUMENTS

| WO | 2011/084913 A2 | 7/2011 |
| WO | 2012/006299 A1 | 1/2012 |
| WO | 2013/009716 A2 | 1/2013 |

OTHER PUBLICATIONS

Schwarz, H. et al. "Overview of the Scalable Video Coding Extension of the H.264/AVC Standard" IEEE Transactions on Circuits and Systems for Video Technology, IEEE Service Center, Piscataway, NJ, US. vol. 17, No. 9, Sep. 1, 2007, pp. 1103-1120.
(Continued)

*Primary Examiner* — Dave Czekaj
*Assistant Examiner* — Kehinde O Abimbola

(57) ABSTRACT

A multi-layer video system has a first layer encoder that encodes a first layer of video information, at least one second layer encoder that encodes at least one second layer of video information, and an encoder side reference processing unit (RPU) that estimates one or more of an optimal filter or an optimal process that applies on a reference picture that is reconstructed from the first video information layer, and processes a current picture of the second video information layer, based on a correlation between the first layer reconstructed reference picture. The correlation relates to a complexity characteristic that scaleably corresponds to the first video information layer reconstructed reference picture and the second video information layer current picture. A scalable video bitstream is outputted, which may be decoded by a compatible decoder. A decoder side RPU and the encoder side RPU function as an RPU pair.

14 Claims, 13 Drawing Sheets

200 Example multilayer scalable system (each EL takes inter-layer reference pictures from a single previous coded layer)

Related U.S. Application Data

(60) Provisional application No. 61/613,312, filed on Mar. 20, 2012.

(51) Int. Cl.

| | | |
|---|---|---|
| *H04N 19/30* | (2014.01) | |
| *H04N 19/103* | (2014.01) | |
| *H04N 19/156* | (2014.01) | |
| *H04N 19/172* | (2014.01) | |
| *H04N 19/50* | (2014.01) | |
| *H04N 19/117* | (2014.01) | |
| *H04N 19/12* | (2014.01) | |
| *H04N 19/132* | (2014.01) | |

(52) U.S. Cl.
CPC ............ *H04N 19/172* (2014.11); *H04N 19/30* (2014.11); *H04N 19/50* (2014.11); *H04N 19/117* (2014.11); *H04N 19/12* (2014.11); *H04N 19/132* (2014.11)

(56) References Cited

U.S. PATENT DOCUMENTS

| | | | |
|---|---|---|---|
| 8,213,508 B2* | 7/2012 | Boyce | H04N 19/61 375/240.16 |
| 9,247,246 B2 | 1/2016 | Lu et al. | |
| 2003/0118097 A1 | 6/2003 | Chen et al. | |
| 2005/0052294 A1 | 3/2005 | Liang et al. | |
| 2005/0195900 A1 | 9/2005 | Han | |
| 2006/0083300 A1 | 4/2006 | Han et al. | |
| 2006/0114999 A1 | 6/2006 | Han et al. | |
| 2006/0165302 A1 | 7/2006 | Han et al. | |
| 2006/0176957 A1* | 8/2006 | Han et al. | |
| 2007/0211798 A1* | 9/2007 | Boyce | H04N 19/61 375/240.16 |
| 2007/0286283 A1 | 12/2007 | Yin et al. | |
| 2008/0062018 A1 | 3/2008 | Normile et al. | |
| 2008/0304567 A1* | 12/2008 | Boyce | H04N 19/61 375/240.16 |
| 2009/0135901 A1 | 5/2009 | Au et al. | |
| 2010/0061447 A1 | 3/2010 | Tu et al. | |
| 2010/0316129 A1 | 12/2010 | Zhao et al. | |
| 2011/0170592 A1* | 7/2011 | Kim | H04N 19/176 375/240.03 |
| 2012/0092452 A1 | 4/2012 | Tourapis et al. | |
| 2012/0183076 A1* | 7/2012 | Boyce | H04N 19/105 375/240.25 |
| 2012/0218380 A1 | 8/2012 | Pan et al. | |
| 2012/0288013 A1* | 11/2012 | Pahalawatta | H04N 19/597 375/240.25 |

OTHER PUBLICATIONS

Van Leuven, S. et al. "Generic Techniques to Reduce SVC Enhancement Layer Encoding Complexity" IEEE Transactions on Consumer Electronics, IEEE Service Center, New York, US. vol. 57, No. 2, May 1, 2011, pp. 827-832.

ITU-T "Advanced Video Coding for Generic Audiovisual Services" http://www.itu.int/rec/recommendation.asp?type=folders&lang=e &parent=T-REC-H.264, Mar. 2010.

Wiegand, T. et al. "WD3: Working Draft 3 of High-Efficiency Video Coding", JCTVC-E603, Joint Collaborative team on Video Coding (JCT-VC) 5th Meeting, Geneva, CH, Mar. 16-23, 2011.

Francois, E. et al. "Requirements for Scalable Extension of HEVC", JCTVC-F488, Joint Collaborative Team on Video Coding 6th Meeting, Torino, IT, Jul. 14-22, 2011.

Wu, F. et al. "Efficient and Universal Scalable Video Coding" IEEE, Piscataway, NJ, Proc. 2002 International Conference on Image Processing, II-37-40, vol. 2.

Wang, J. et al. "CCL-SVC: Optimizing User Experience of Broadcasting Video on Computation Capability Limited Handheld Devices" 2008 IEEE 10th Workshop on Multimedia Signal Processing, IEEE, pp. 429-432.

Grois, D. et al "Efficient Adaptive Bit-Rate Control for Scalable Video Coding by Using Computational Complexity-rate Distortion Analysis" 2011 IEEE International Symposium on Broadband Multimedia Systems and Broadcasting, Jun. 8-10, 2011.

Mastronarde, N. et al. "Designing Autonomous Layered Video Coders" Image Communication, vol. 24, No. 6, Jul. 2009, pp. 417-436.

Chen, R.Y. et al. "Complexity-Adaptive Streaming Architecture for Video Multicasting to CE Devices" 2003 Digest of Technical Papers, pp. 132-133, published 2003.

Non-Final Office Action for U.S. Appl. No. 13/847,022, filed Mar. 19, 2013 on behalf of Taoran Lu. Mail Date: Jan. 30, 2015. 19 pages.

Final Office Action for U.S. Appl. No. 13/847,022, filed Mar. 19, 2013 on behalf of Taoran Lu. Mail Date: Jun. 10, 2015. 37 pages.

Notice of Allowance for U.S. Appl. No. 13/847,022, filed Mar. 19, 2013 on behalf of Taoran Lu. Mail Date: Oct. 7, 2015. 29 pages.

\* cited by examiner

100 Example two-layer video coding system diagram (with encoder & decoder)

200 Example multilayer scalable system (each EL takes inter-layer reference pictures from a single previous coded layer)

300 Example multilayer scalable system (each EL takes inter-layer reference pictures from > 1 previous coded layers)

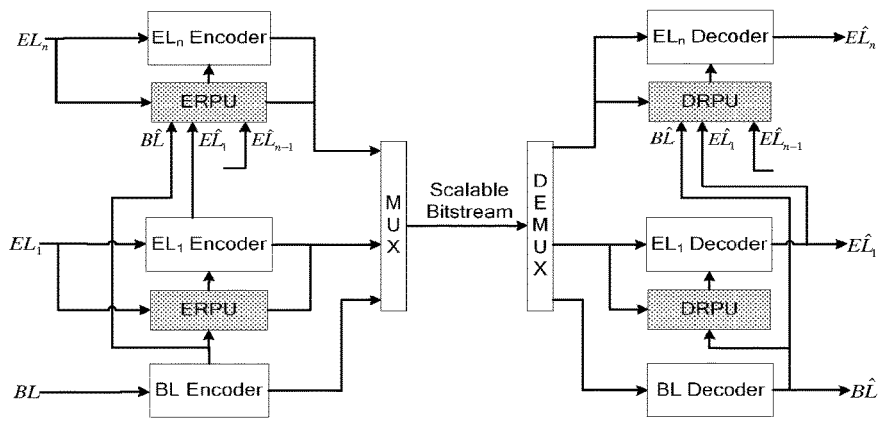

Fig. 3

400 Example typical single layer video encoder with ERPU

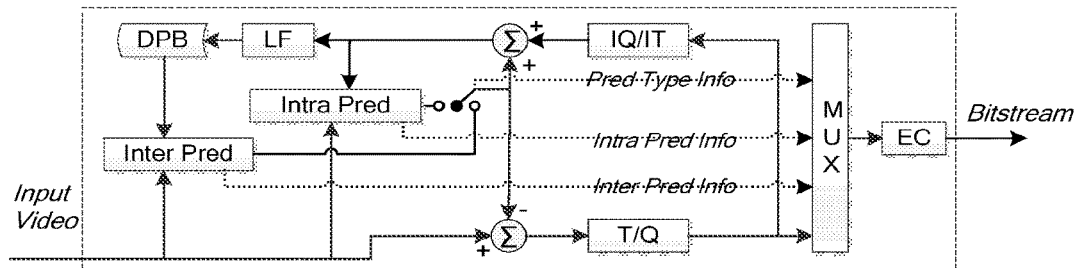

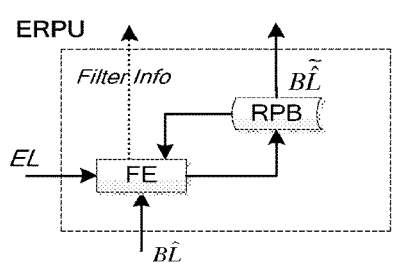

DPB: decoded picture buffer
LF: loop filter
Intra Pred: intra prediction
Inter Pred: inter prediction (ME/MC)
T/Q: transform and quantization
IQ/IT: inverse transform and quantization
EC: entropy coding
RPB: inter-layer reference picture buffer
FE: filter estimation

Fig. 4

500 Example single layer video decoder with DRPU
Single Layer Decoder
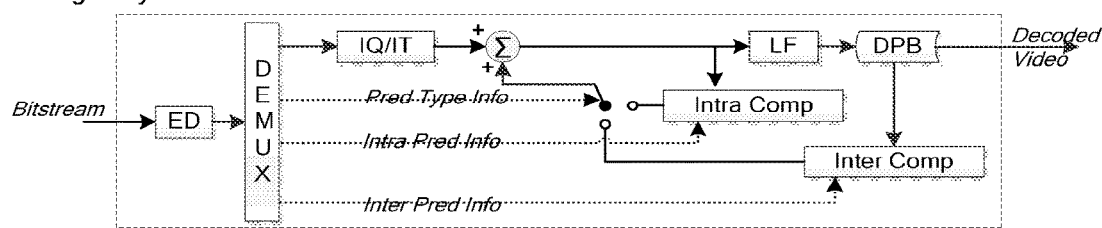
DRPU
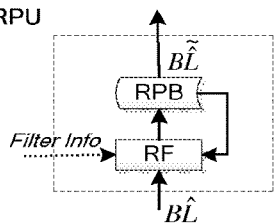
DPB: decoded picture buffer
LF: loop filter
Comp: compensation
IQ/IT: inverse transform and quantization
ED: entropy decoding
RPB: inter-layer reference picture buffer
RF: reference filtering
Fig. 5

700 Example multilayer video decoding system with RPU (picture coding mode)

1000 Example BCM (bypass coding mode) encoding & decoding (partial)

1100 Example BPM (bypass prediction mode) encoding & decoding (partial)

1200 Example distortion thresholding based adaptive complexity mode switching process 1300 Example three-layer complexity scalability encoder diagram with active complexity profiles/modes 1400 Example three-layer mixed-codec 1500 Example three-layer combination of complexity scalability with other scalabilities 1600 Example user cases for the three-layer combined scalability

COMPLEXITY SCALABLE MULTILAYER VIDEO CODING

CROSS-REFERENCE TO RELATED APPLICATIONS

This application is a Continuation of U.S. application Ser. No. 13/847,022, filed on Mar. 19, 2013, which, in turn claims priority to U.S. Patent Provisional Application No. 61/613,312, filed Mar. 20, 2012, which are hereby incorporated by reference in their entirety.

TECHNOLOGY

The present invention relates generally to video and image coding. More particularly, embodiments of the present invention relates to complexity scalable multilayer video coding.

BACKGROUND

Video information may comprise particular content. Various client computer networking devices may differ significantly in their ability to display video information. As used herein, the display of video information may relate to processing and rendering particular video content or other video data with any of the various client devices for display therewith. Notwithstanding their different video processing, rendering or display capabilities, it may be desirable to display particular content or other video data with more than one of the various client devices. Thus for example, independent bitstreams of video data may be generated individually for each of the various client devices on which the content that corresponds to each of the independent bitstreams is to be displayed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

Embodiments of the present invention are described by way of example, and not by way of limitation, as represented in the FIG.s of the accompanying drawings and in which like reference numerals refer to similar elements and in which:

FIG. 3 depicts example encoder side RPUs that each use decoded pictures from multiple previously coded layers, according to an embodiment of the present invention;

FIG. 4 depicts an example single layer video encoder, according to an embodiment of the present invention;

FIG. 5 depicts an example single layer video decoder, according to an embodiment of the present invention;

DESCRIPTION OF EXAMPLE EMBODIMENTS

Figure 1:
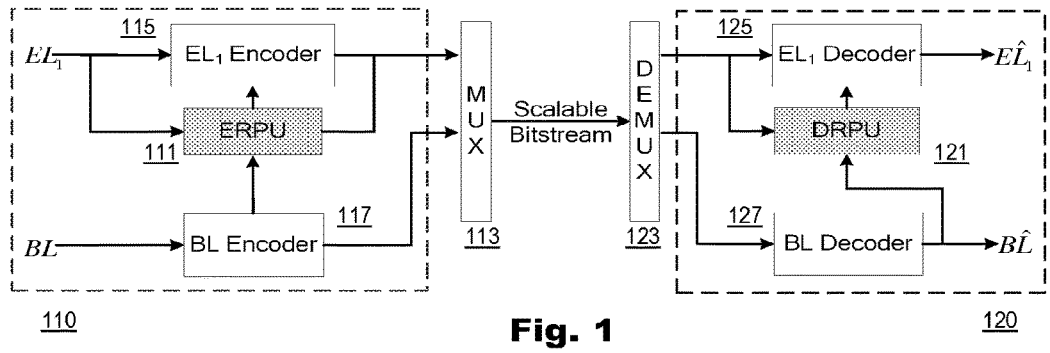
FIG. 1 depicts an example multilayer video system, according to an embodiment of the present invention.

Complexity scalable multilayer video coding is described herein. Scalable video coding (SVC) allows efficient delivery of video information to various clients simultaneously, notwithstanding the differences in processing, rendering and display capabilities each of the various clients. SVC exploits correlations that exist among video information. In the following description, for the purposes of explanation, numerous specific details are set forth in order to provide a thorough understanding of the present invention. It will be apparent, however, that embodiments of the present invention may be practiced without these specific details. In other instances, well-known structures and devices are not described in exhaustive detail, in order to avoid unnecessarily obscuring, occluding or obfuscating the present invention.

Overview

In order to display content over such a variety of clients, each of which having different display capabilities, a video bitstream layer may be generated independently for each of the client devices. Scalable video coding (SVC) allows efficient delivery of video information to various clients simultaneously, notwithstanding the differences in processing, rendering and display capabilities each of the various clients. SVC exploits correlations that exist among video information.

A multi-layer video system has a first layer encoder that encodes a first layer of video information, at least one second layer encoder that encodes at least one second layer of video information, and an encoder side reference processing unit (RPU) that estimates one or more of an optimal filter or an optimal process that applies on a reference picture that is reconstructed from the first video information layer, and processes a current picture of the second video information layer, based on a correlation between the first layer reconstructed reference picture. The correlation relates to a complexity characteristic that scaleably corresponds to the first video information layer reconstructed reference picture and the second video information layer current picture. A scalable video bitstream is outputted, which may be decoded by a compatible decoder. A decoder side RPU and the encoder side RPU function as an RPU pair.

Example Embodiments

Instead of generating independent bitstreams for the different video layers, which target to each of multiple clients, an embodiment exploits correlations that may exist among the video layers to efficiently encode the video into a single bitstream, which may be used to render the corresponding video content by any of the various clients. A video base layer (BL) is coded independently. An enhancement layer (EL) or multiple ELs are coded, based on the BL or on coded ELs that were coded previously. Embodiments of the present invention relate to any of various scalability aspects. For example, embodiments may perform SVC based on scalability in spatial, temporal, quality, bit-depth, aspect ratio, view (e.g., stereo or multiview), complexity, chroma sampling, color gamut characteristics of the video content or on combinations of these scalability related characteristics.

An embodiment of the present invention relates to a system, which provides complexity scalability. The complexity scalable system is based on a multi-layer codec. The system uses a reference process unit (RPU), which functions to perform guided processing over inter-layer reference pictures. FIG. 1 depicts an example multilayer video system 100, according to an embodiment of the present invention. Video system 100 comprises an encoder 110 and a decoder 120. Video system 100 functions with two layers, a single BL and a single EL. Encoder 110 thus comprises an EL encoder component 115 and a BL encoder component 117. Decoder 120 thus comprises an EL decoder component 125 and a BL decoder component 127.

In encoder 110, EL encoder 115 encodes first EL pictures $EL_1$ to generate an encoded EL layer video sequence. BL encoder 117 encodes BL pictures BL to generate an encoded BL layer video sequence.

An encoder side RPU (ERPU) 111 and a decoder side RPU (DRPU) 121 comprise a reference processing unit RPU pair within coding system 100. ERPU 111 estimates an optimal filter and/or process that applies on the decoded (e.g., reconstructed) picture. The estimated optimal filter/process reduces computational costs, which on the basis of mean-squared-error (MSE) and/or one or more other error metrics may be associated with the $EL_1$ input picture and a decoded BL picture that, e.g., may be reconstructed as a function of BL encoder 117. MUX 113 multiplexes the EL layer video stream and the BL layer video stream into a scalable bitstream.

DEMUX 123 demultiplexes the scalable bitstream into the BL layer video stream and the EL layer video stream for decoder 120. At the decoder side, DRPU 121 gets decoded picture(s) from BL decoder 127 and performs filtering and/or processing appropriate to the optimal filters/processes of ERPU 111, which may be signaled in the EL layer video stream component of the multiplexed scalable bitstream. Decoder 120 outputs a decoded, reconstructed first EL video stream $EL\hat{}_1$ and BL video stream $BL\hat{}$.

Figure 2:
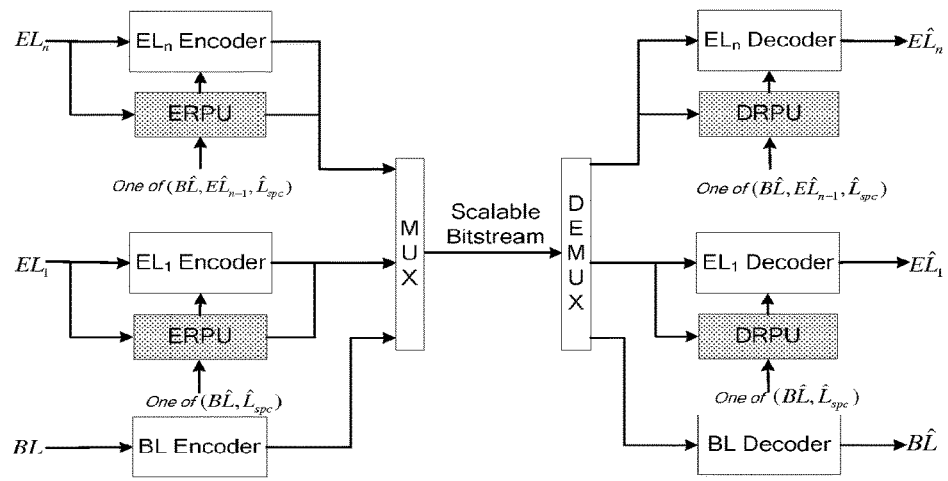
FIG. 2 depicts example RPU pairs that use decoded/ reconstructed pictures from a previously coded layer, according to an embodiment of the present invention.

Example embodiments extend the multi-layer system design over more than two layers. FIG. 2 depicts example encoder side RPU pairs and decoder side RPU pairs, which each use decoded/reconstructed pictures from a single previously coded layer, according to an embodiment of the present invention. Each RPU pair takes decoded/reconstructed pictures from one previously coded layer, of which there may be several choices. In an embodiment, each of the EL RPUs takes the decoded/reconstructed picture from the BL. While this option allows parallel processing of the enhancement layers, an embodiment functions with degraded inter-layer prediction or functions to prevent inter-layer prediction degradation. Additionally or alternatively, an embodiment may take the decoded/reconstructed picture from the immediate previous layer, in a straightforward sequential configuration.

Another additional or alternative embodiment functions to specify which reference layer, or to select from among several reference layers, which layers to use for inter-layer prediction. Specifying which reference layers to use maximizes flexibility in customizing the scalable video system. FIG. 3 depicts an example system 300 that comprises encoder side RPUs, each of which use decoded pictures from multiple previously coded layers, according to an embodiment of the present invention. FIG. 2 and FIG. 3 each depict relatively complex example systems, relative to the system depicted in FIG. 1. For simplicity, clarity and brevity however, embodiments of the present invention are described with reference to a single layer system, e.g., as depicted in FIG. 1.

FIG. 4 depicts an example single layer video encoder 400, according to an embodiment of the present invention. Video encoder 400 has an intra prediction module 'intra pred', an inter prediction (e.g., motion estimation/compensation) module 'inter pred', a loop filter 'LF', a transform and quantization module 'T/Q', an inverse quantization and inverse transform module 'IQ/IT', two summing amplifiers 'Σ', a multiplexer 'MUX', an entropy coding module 'EC', and decoded picture buffer 'DPB'. Encoder 400 may thus encode video bitstreams that are compliant with one or more contemporary, state of the art, advanced and/or legacy video codec standards, such as ISO/ITU H.264/AVC (Advanced Video Codec), MPEG-4, HEVC (High Efficiency Video Codec) and MPEG-2. Encoder 400 also comprises an EPRU.

The ERPU of encoder 400 comprises a filter estimation module 'FE'. Filter estimation module FE performs the optimization of inter-layer references. The encoder 400 ERPU also comprises an inter-layer reference picture buffer 'RPB'. The inter-layer reference picture buffer RPB stores the pictures, which are filtered according to the estimations of the filter estimation module FE.

FIG. 5 depicts an example single layer video decoder 500, according to an embodiment of the present invention. Decoder 500 corresponds in certain respects to encoder 400 (FIG. 4). For example, decoder 500 comprises an entropy decoder 'ED', a demultiplexer 'demux', a summing amplifier 'Σ', an inverse quantization and inverse transform module 'IQ/IT', a loop filter 'LF', an intra-layer compensation module 'intra comp', an inter-layer compensation module 'inter comp', and a decoded picture buffer 'DPB'.

The DRPU of decoder 500 comprises a reference filtering module 'RF' and a reference picture buffer 'RPB'. Filter optimization is obviated in the DRPU of decoder 500. Instead of computing filter optimization, the DRPU of decoder 500 has the reference filtering module RF, which performs filtering and/or processing according to filter information, which is sent in the bitstream.

Figure 6A:
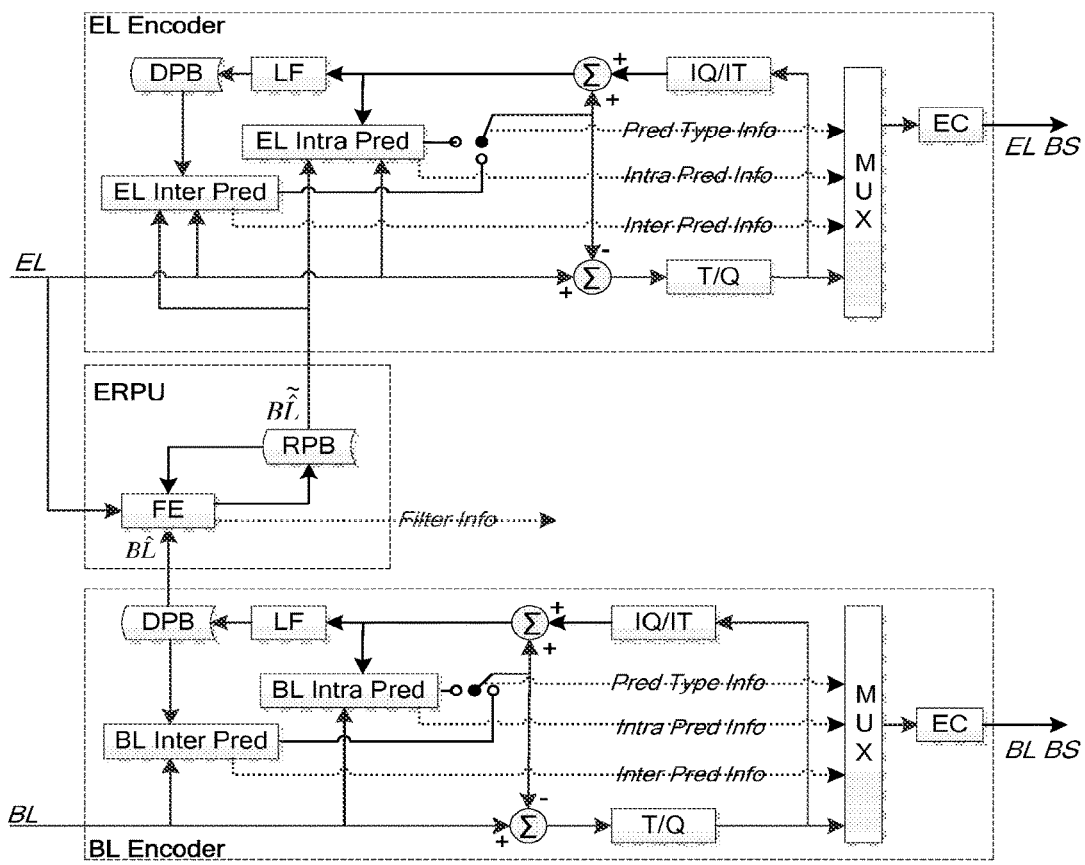
FIG. 6A and FIG. 6B depict example multilayer video encoders, with which an embodiment of the present invention may be implemented.
Figure 6B:
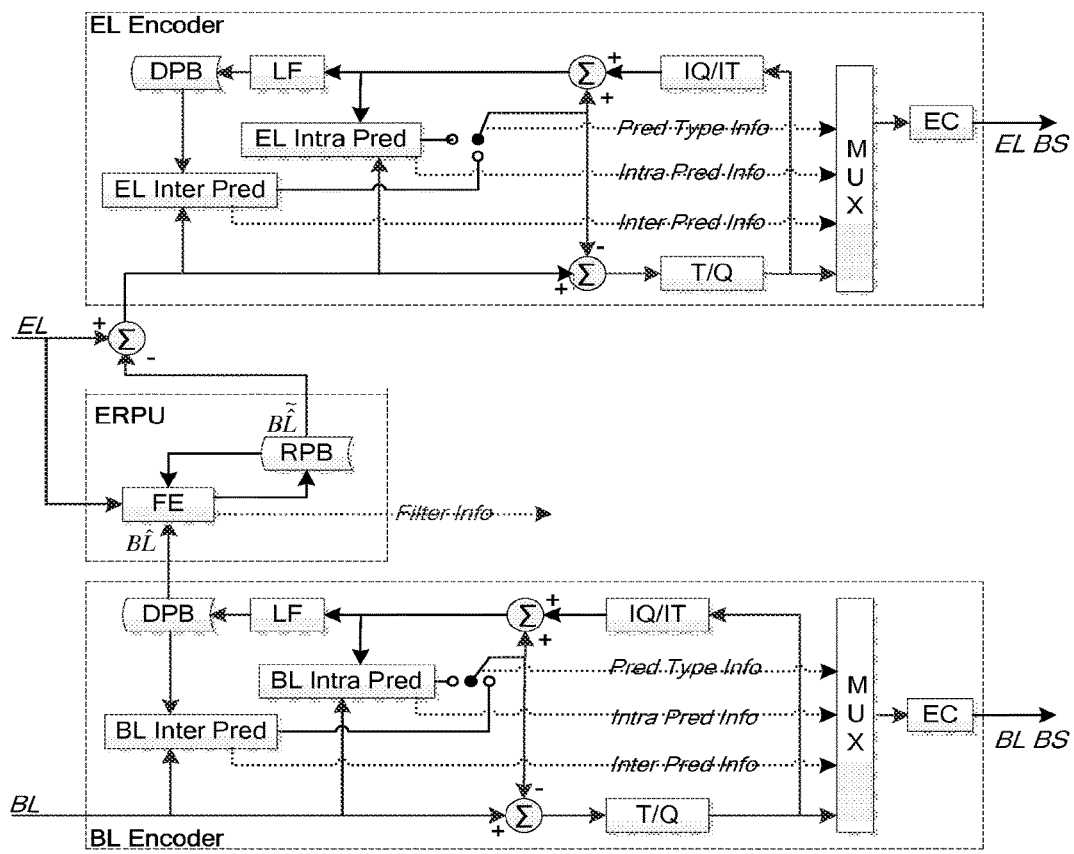

FIG. 6A depicts an example multilayer video encoder 600, with which an embodiment of the present invention may be implemented. Encoder 600 comprises an ERPU that is configured to function in a picture coding mode. FIG. 6B depicts an example multilayer video encoder 650, with which an embodiment of the present invention may be implemented. Encoder 650 comprises an ERPU that is configured to function in a differential coding mode.

Figure 7A:
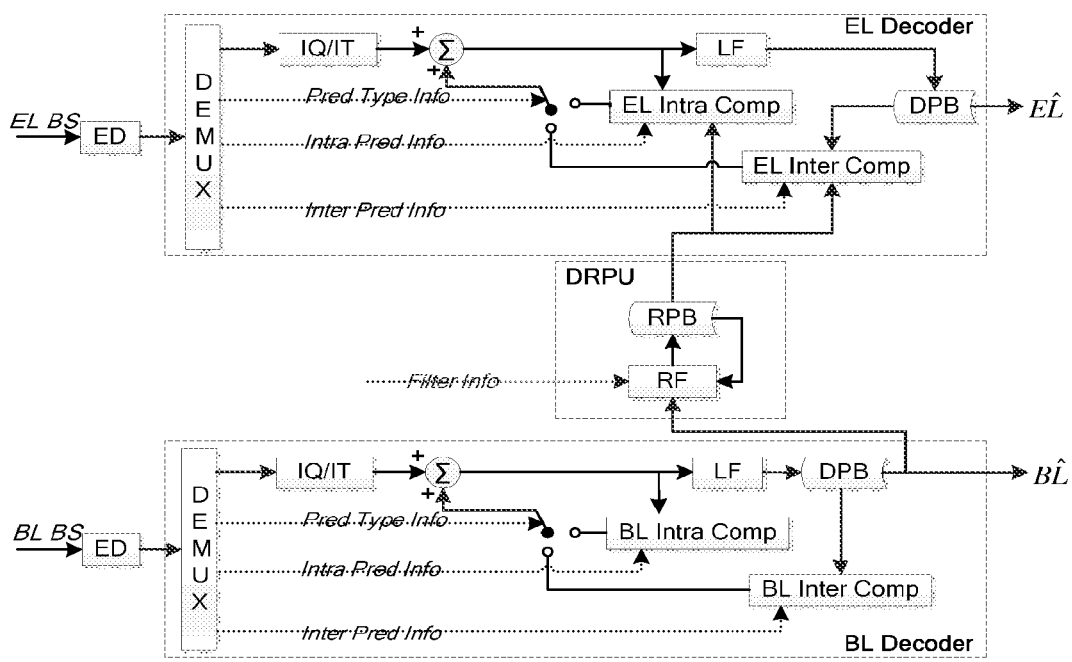
FIG. 7A and FIG. 7B depict example multilayer video decoders, with which an embodiment of the present invention may be implemented.
Figure 7B:
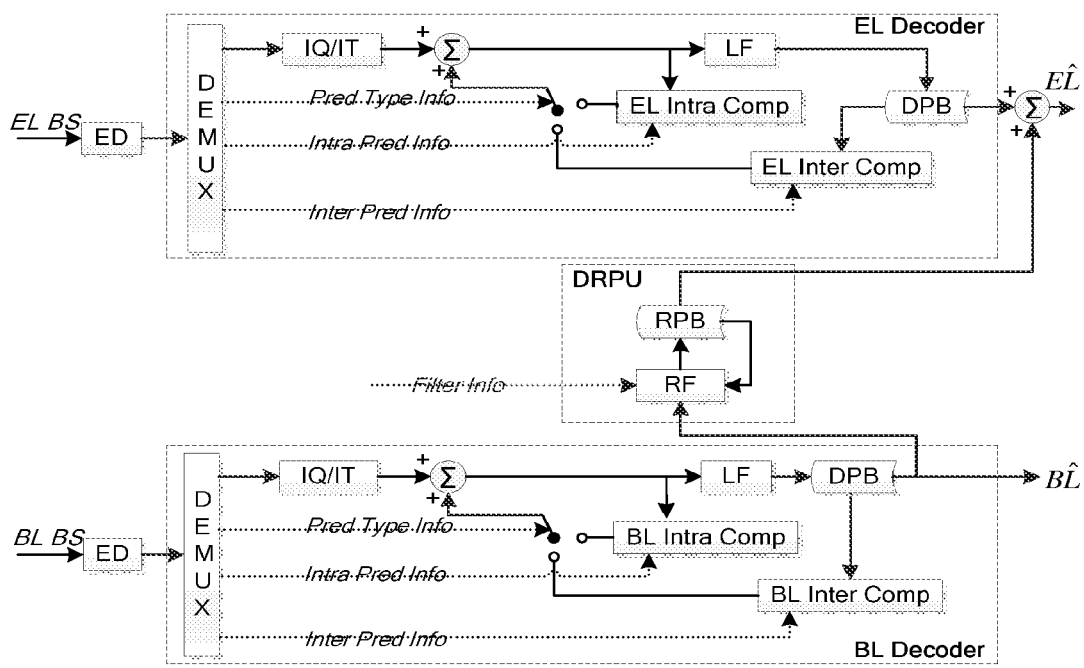

FIG. 7A depicts an example multilayer video decoder 700, with which an embodiment of the present invention may be implemented. Decoder 700 comprises a DRPU that is configured to function in a picture coding mode. FIG. 7B depicts an example multilayer video decoder 750, with which an embodiment of the present invention may be implemented. Decoder 750 comprises a DRPU that is configured to function in a differential coding mode.

Example Complexity Scalable Multilayer System with RPU

Adding a full-functional single layer codec incorporates the full-complexity of that single layer codec. Under strict complexity requirements, addition of multiple single layer codecs may not be an optimal or most efficient approach. An embodiment of the present invention provides complexity scalability. An embodiment functions over four levels of complexity, which may be combined in a single, multifunctional codec approach.

Level 1: RPU to EL Example Complexity Modes

Figure 8:
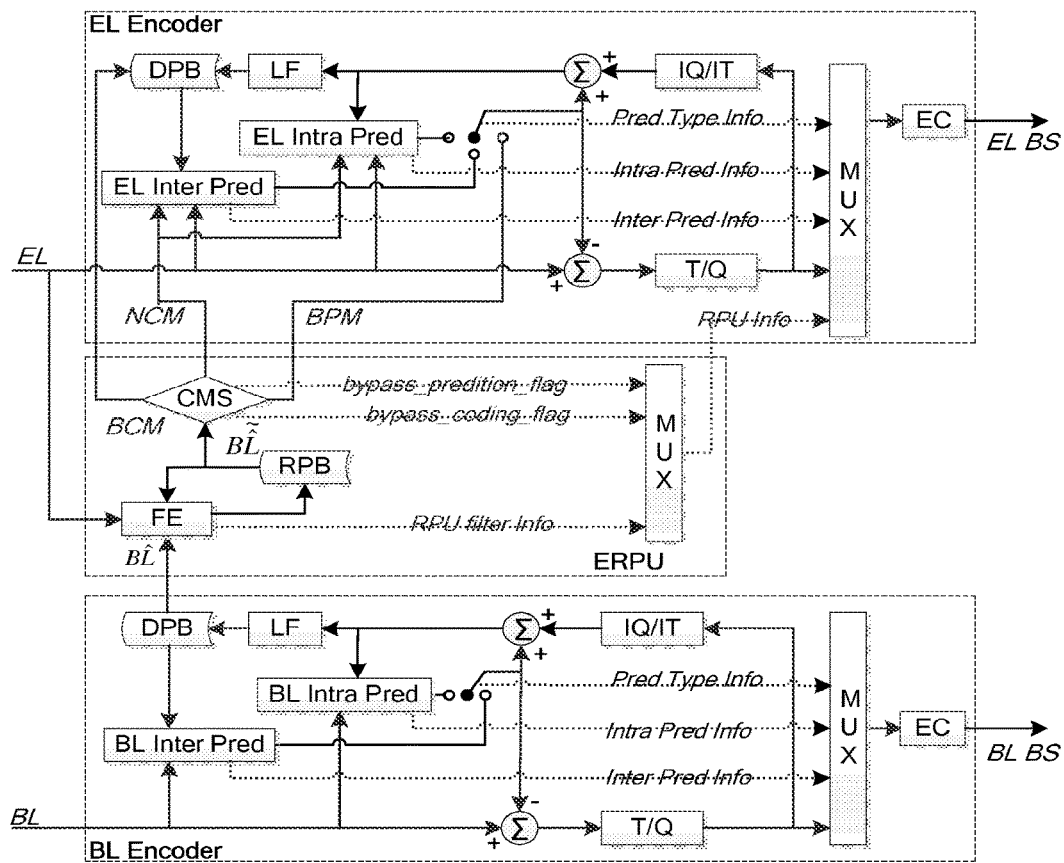
FIG. 8 depicts an example multilayer video encoder, according to an embodiment of the present invention.
Figure 9:
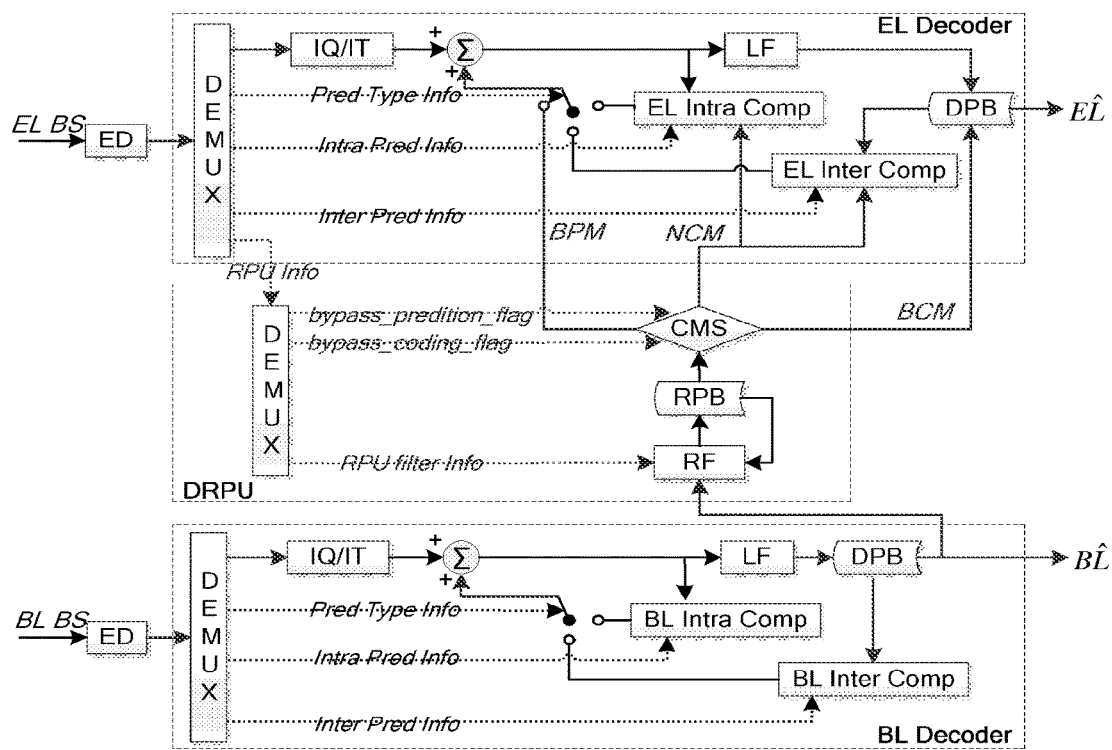
FIG. 9 depicts an example multilayer video decoder, according to an embodiment of the present invention.

An embodiment achieves complexity scalability by allowing the RPU to send processed pictures to different places in the EL. Sending processed pictures from the RPU to different places in the EL accommodates multiple user cases and provides a reasonable trade-off between performance and complexity. FIG. 8 depicts an example multilayer video encoder 800, according to an embodiment of the present invention. FIG. 9 depicts an example multilayer video decoder 900, according to an embodiment of the present invention. Decoder 900 may correspond to or be compatible with encoder 800. In addition to the features of encoders 600 and 650 (FIG. 6A, FIG. 6B) and decoders 700 and 750 (FIG. 7A, FIG. 7B), the multilayer encoder 800 and decoder 900 further comprise a complexity mode switch (CMS) module 'CMS' in the RPU. Three complexity modes are supported by sending the processed reference picture to different modules in the EL codec. Two flags are added to RPU syntax to signal the complexity modes. The flags comprise a bypass_coding_flag and a bypass_prediction_flag. The three complexity modes are described below.

Example Bypass Coding Mode

Figure 10:
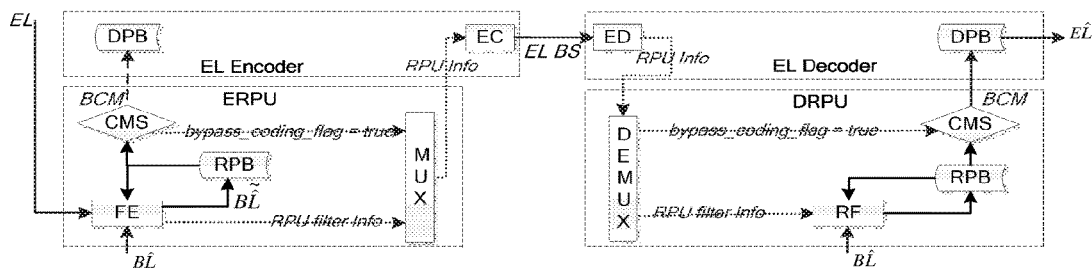
FIG. 10 depicts example encoding and decoding bypass coding modes, according to an embodiment of the present invention.

FIG. 10 depicts example encoding and decoding bypass coding modes (BCM) 1000, according to an embodiment of the present invention. No changes characterize the base layer codec under BCM 1000. (Thus e.g., no BL is depicted in FIG. 10.) EL encoding/decoding is bypassed in the BCM 1000. At the encoder side, storing filtered reconstructed BL pictures in the DPB is obviated, unless a filtered reconstructed BL picture is to be used as the temporal reference for a next frame to be coded, e.g., in a coding order. The EL bitstream thus comprises the entropy coded RPU filter information and the bypass_coding_flag, which is set in the ERPU to a value that represents true.

At the decoder side, the DRPU parses the filter information and processes the appropriate filtering according to the parsed information. The filtered reconstructed BL picture is directly outputted as the coded (e.g., reconstructed) EL picture. Under BCM, a single loop functions for motion estimation/compensation as well as transform/quantization. The complexity associated with the BCM is comparable, with added costs for RPU reference processing, to that of a single layer codec, e.g., in terms of computational cost, processor demands, memory usage, and/or power consumption and related considerations. The additional RPU costs depend basically on the filtering and/or processing that are taken for the reference processing. BCM has the lowest complexity among the three complexity modes described herein and the two other modes may exhibit superior performance in relation to BCM performance.

Example Bypass Prediction Mode

Figure 11:
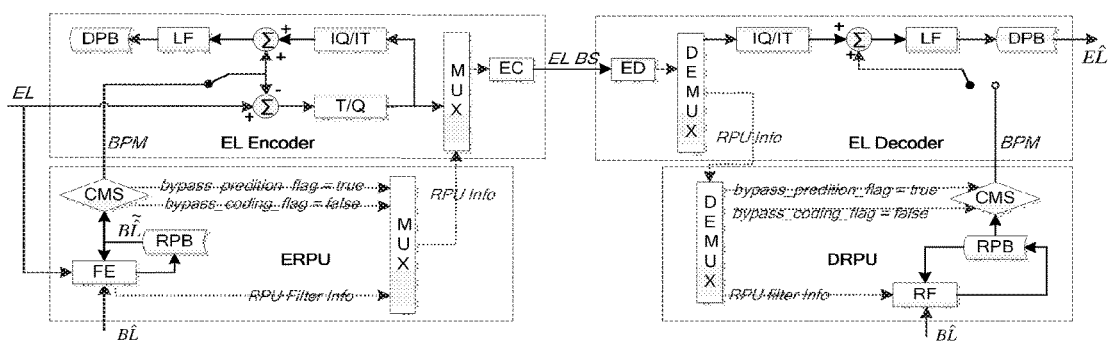
FIG. 11 depicts example encoding and decoding bypass prediction modes, according to an embodiment of the present invention.

FIG. 11 depicts example encoding and decoding bypass prediction modes (BPM), according to an embodiment of the present invention. Under BPM, both the EL inter-prediction and intra-prediction processes are bypassed. In BPM, the filtered reconstructed BL picture functions directly as the prediction signal. The filtered reconstructed BL picture is subtracted from the EL original picture. The remainder from the subtraction of the filtered reconstructed BL picture is subtracted from the EL original picture comprises a residual picture, e.g., a residue. The residual functions for transformation/quantization and entropy coding. Thus, BPM functions to effectively provide a residue coding mode.

The decoder in BPM also belongs to the category of single loop decoding because for example, a single motion compensation loop suffices at decoder. While the complexity associated with BPM may exceed that of BCM (e.g., for the execution of the transform, quantization and entropy coding processes), BPM may have a reduced latency relative thereto. BPM may avoid relatively time-consuming prediction processes (e.g., motion estimation/compensation) and the memory demands presented by decoder side multiple loop decoding.

In BPM, the EL bitstream comprises the entropy coded RPU information. Such RPU information may relate to RPU filter optimization, a bypass_coding_flag setting of false, a bypass_prediction_flag setting of true and/or transform/quantization coefficients or related parameters. At the decoder side, the filtered reconstructed BL picture functions directly as the prediction signal and is added to the decoded EL residue to generate the reconstructed EL picture. EL motion compensation and intra compensation are obviated.

Normal Coding Mode

An embodiment functions in a normal coding mode NCM). Under NCM, a codec system may have features that conform substantially to features such as those, which are depicted in FIG. 6A, FIG. 6B, FIG. 7A and/or FIG. 7B. The filtered reconstructed BL picture is used under NCM for inter-layer prediction in the EL. The decoder conforms substantially to a category of multiple loop decoding because, e.g., motion compensation loops are used at both the BL and the EL. An example embodiment may balance or weigh complexity in relation to desired performance characteristics and select a mode that optimizes performance in relation to available computing resources and/or bandwidth. The EL bitstream may comprise entropy coded RPU information. The entropy encoded RPU information may relate to RPU filter characteristics, and both of the coding species flags (e.g., each of which may be set to false), prediction related information, transform coefficients, quantization coefficients and/or other parameters.

In an embodiment, the BCM, BPM and NCM may each have an independent complexity that is associated therewith.

The complexity may range between the modes. For example, BCM may be simple relative to BPM, which may be simple relative to NCM.

Coding method complexity may be constrained by network or client capabilities such as the availability of bandwidth or computing resources, which may range or change over time or other dimensions. Within a given complexity constraint however, an embodiment optimizes coding efficiency and/or conserves on complexity. In an embodiment, complexity modes may be selected or specified, e.g., as an automatically programmed or configured, or a user selected parameter, programmed, set or entered before encoding executes. In an additional or alternative embodiment, complexity modes may be selected adaptively during an encoding process.

For example, scalable systems for mobile and video capture devices may support coding modes that use a temporal coding/decoding loop at a spatial BL. Coding modes that use a temporal coding/decoding loop at a spatial BL use memory, processing and other computation resources with an intensity that more closely aligns with typical BL uses than to corresponding EL uses. Coding modes that use a temporal coding/decoding loop at a spatial BL adapt their complexity modes selectively. An embodiment uses Rate Distortion Optimization (RDO), combined with an added complexity constraint to incorporate complexity into the optimization computation to achieve an effective rate distortion complexity optimization (RDCO).

Figure 12:
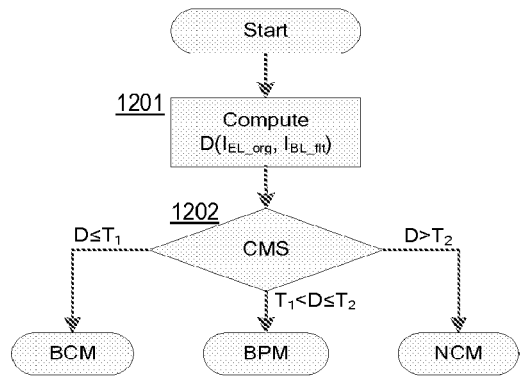
FIG. 12 depicts an example single layer video decoder, according to an embodiment of the present invention.

FIG. 12 depicts an example single layer video decoder 1200, according to an embodiment of the present invention. Decoder 1200 computes a threshold distortion level (1201). Decoder 1200 comprises an example adaptive mode switching module 1202, which uses a threshold based approach that functions to avoid degrading coding efficiency while achieving the desired complexity levels. Adaptive mode switching module 1202 for example, functions as follows. If the distortion associated with the original EL and filtered, reconstructed BL is less than or equal to a first distortion threshold T1, then BCM is used:

if Dist(EL original, filtered BL reconstructed)≤T1, use BCM.

If the first distortion threshold T1 is less than the distortion associated with the original EL and filtered, reconstructed BL, then BPM is used:

if T1<Dist(EL original, filtered BL reconstructed)≤T2, use BPM.

If however neither the distortion associated with the original EL and filtered, reconstructed BL is less than or equal to a first distortion threshold T1, nor the first distortion threshold T1 is less than the distortion associated with the original EL and filtered, reconstructed BL, then NCM is used:

otherwise, use NCM.

The distortion of the filtered BL picture with the EL original picture is constrained under the threshold T1, which is relatively small. Thus, skipping EL encoding does not degrade performance significantly.

Complexity mode selection processes may comprise layers or picture type-based, profile-based, and/or RDO-based algorithms. In an embodiment, the granularity of complexity adaptation may be based on picture level, region level, or multiples of coding unit. In an embodiment, the RPU functions to signal such mode information. RPU based mode information signaling provides flexibility to codec systems in balancing decoding complexity and compression efficiency.

An embodiment exploits varying or differing coding complexities that may be associated with the BCM, BPM and NCM coding modes. For example, an embodiment provides real-time encoding for applications that comprise live video streaming, sharing and video conference with limited computation capability terminals (e.g., such as may characterize some portable devices). The encoder selects the mode based on availability of computation resources and the encoding time, which affects the end-to-end delay. The encoder can select an optimal mode based on end-to-end delay and content characteristics for each region. Thus, the encoder can allocate more complex modes for more significant or important regions, if the system can meet delay strictures, which may be set.

In an example embodiment, if the fullness of a coding picture buffer (CPB) is low, then an encoder can invoke a less complex mode such as BCM to meet the delay requirement. NCM may be performed more economically, e.g., for regions where a normal (e.g., in a binocular, opthamological, statistical, medical, physiological and/or aesthetic sense) human visual system (HVS) is most sensitive. For instance, the HVS may be more sensitive in image regions that have less motion and a low or medium texture, than in image areas with more motion content and/or a medium that may be richer than low-to-medium. An embodiment uses BCM for such high motion and/or high texture regions, and may use BPM for regions with lower or more medium motion and lower or more medium textures.

Level 2: RPU Filter Complexity Profiles

An embodiment achieves complexity scalability by defining a complexity profile (CP) or several CPs for RPU filters/processors. For example, RPUs that process spatial scalability may use nearest neighbour filters, bilinear filters, AVC 6-tap (or other multi-tap) filters, discrete cosine transform interpolation filter (DCT-IF), Lanczos filters, bicubic filters, spline filters, explicit two dimensional (2D) Weiner filters, inpainting filters, and/or super resolution filters as well as others. Some of these filters have a relatively low complexity compared with other filters that may be used. For example, nearest neighbour filters, bilinear filters, and one-dimensional (1D) fixed filters have a relatively low complexity. Some of these filters however have a relatively high complexity compared with other filters that may be used. For example, explicit 2D filters and some nonlinear filtering approach, such as used in 'inpainting' applications have a relatively high complexity. Thus, an embodiment defines profiles that relate to different filters, wherein the profiles are helpful for complexity control.

For example, an embodiment may be implemented wherein a first complexity profile CP1 comprises a 1D fixed filter, such as a bilinear filter, a Lanczos-2(3) filter, a DCT-IF filter and/or an AVC 6-tap (or other multi-tap) filter. A second complexity profile CP2 comprises an explicit 1D filter. A third complexity profile CP3 comprises explicit 2D filters and spline filters. A fourth complexity profile CP4 comprises inpainting filters and super resolution filters. CP1 comprises the set of filters that has the lowest complexity, relative to these others and CP4 comprises the filter set that has most complexity, relative to these others. In an embodiment, a larger CP index may thus correspond to a higher level of complexity. In an embodiment wherein a first index of filters CPn is specified wherein 'n' comprises an integer, then all filters in a second filter index CPm, wherein m comprises an integer that is less than n (m≤n) are available for use.

Level 3: Codec Profile Level

In an embodiment, each single layer has its own encoding configuration and conforms to a given single layer complexity profile P, which is independent of the profiles that are associated with other layers. Thus, an embodiment may implement or use any of multiple coding tools across various layers. Each of the multiple coding tools may have different complexities associated therewith. An embodiment may thus implement flexibility wherein the BL is compliant with a first complexity profile and the compression of one or more ELs proceeds with coding tools that are associated with one or more complexity profiles, which differ from the first complexity profile and perhaps, from each other.

Thus, for a single layer HEVC based codec, while the BL is coded with a first CP $P_1$, an embodiment may code the EL layer with a second CP $P_2$ and moreover, the first CP $P_1$ and the second CP $P_2$ may differ. For example, the first CP $P_1$ may be characterized by having an adaptive loop filter (ALF) disabled and by using context-adaptive variable length code (CAVLC). The second CP $P_2$ may be characterized however by having an ALF enabled/on and by using context-adaptive binary arithmetic coding (CABAC).

Figure 13:
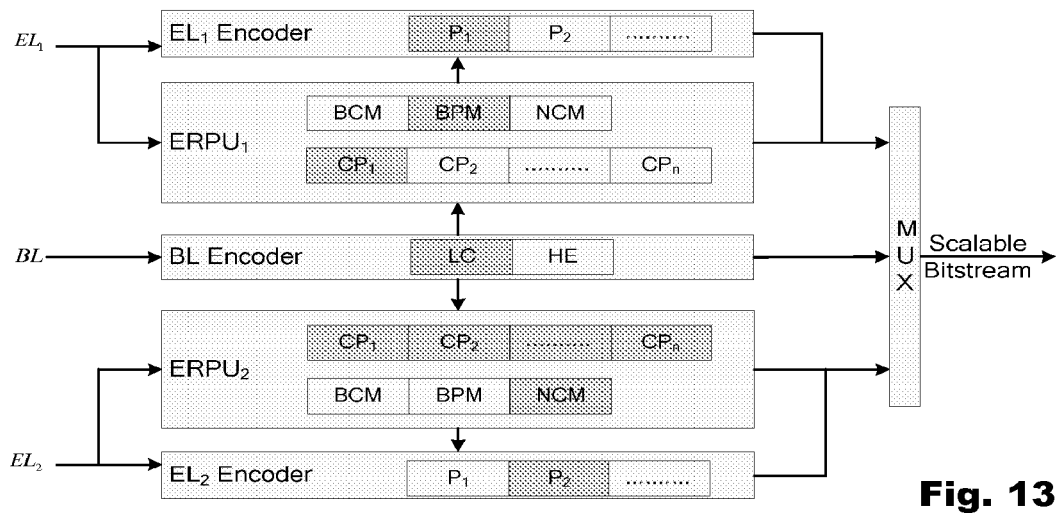
FIG. 13 depicts an example adaptive mode switching module, according to an embodiment of the present invention.

An embodiment functions to cascade: (1) the RPU to EL complexity modes level, (2) the RPU filters complexity profile level, and (3) the codec complexity profile level. In cascading these three profile levels an embodiment provides complexity scalability with fine-granularity. For instance, with four CPs that are associated with RPU filters and two CPs that are associated with single layer profiles, then over the three cascading levels, 24 different complexity scenarios emerge (3 complexity levels times 4 RPU filter CPs times 2 single-layer CPs=24 complexity scenarios). FIG. 13 depicts an example adaptive mode switching module (AMSM) 1300, according to an embodiment of the present invention.

AMSM 1300 functions as a three-layer complexity scalability encoder with active complexity profiles/modes. AMSM 1300 has a single BL and two ELs, EL1 and EL2. The BL can be coded using a single-layer low complexity profile LC. ERPU1 processes the inter-layer reference for EL1, which itself is coded using the LC profile. ERPU1 enables selectively the RPU filters within CP1 and uses selectively the BPM complexity mode. ERPU2 processes the inter-layer reference for EL2, which itself is coded using the profile HE. ERPU2 enables selectively all RPU filters and uses selectively the NCM complexity mode. In an embodiment, if EL1 and EL2 take the same input, then EL2 provides a higher coding efficiency than EL1, but at the expense of increased complexity.

Level 4: Hybrid Architectures Level

An embodiment confers yet an additional level of complexity scalability with hybrid architectures. Modern single layer video codecs (e.g., MPEG-2, H.264/AVC, HEVC) share functional modules such as some of those, which are depicted as features in FIG. 4 and FIG. 5. From one perspective, MPEG-2 may be thought to provide a simpler solution, but with lower coding efficiency, than the other example codecs. In contrast from the same perspective, HEVC may be thought to provide a more complex solution, but with high coding efficiency. From this perspective, the solution provided by H.264/AVC may be thought to more complex than that of MPEG-2 but less than that of HEVC and, to have an associated coding efficiency that is somewhere between the relatively low efficiency of MPEG-2 and the relatively high efficiency of HEVC. Legacy codecs persist in video markets and transitions from older solutions to newer or more advanced solutions may not be rapid or initially widespread or commonly accepted. Thus, significant codec lifetime overlaps are not uncommon.

Figure 14:
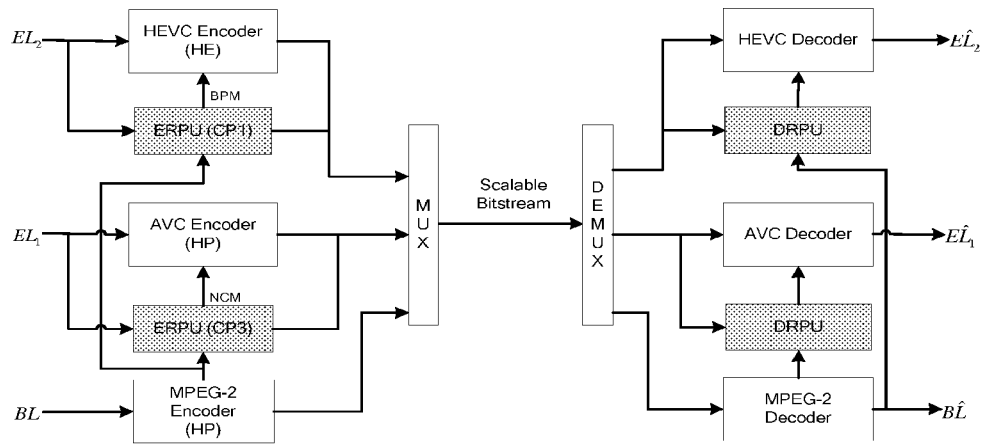
FIG. 14 depicts an example three layer mixed-codec, according to an embodiment of the present invention.

An embodiment functions with mixed-codec solutions to solve compatible problems. For instance, a legacy codec (e.g., MPEG-2) may be used to code the BL and an advanced codec (e.g., HEVC, ISO/ITC H.264/AVC MPEG-4) may be used to code the EL. In an embodiment, coded BL pictures are pulled up and processed by the RPU, which obviates low-level syntax translation (e.g., motion vectors, modes, etc.) between layers of different coding standards. FIG. 14 depicts an example three layer mixed-codec, according to an embodiment of the present invention. Mixed codec system 1400 functions over the three complexity levels, as described above. For example, the BL is coded using MPEG-2 high profile (HP). ERPU1 pulls up the reconstructed BL picture to the first EL $EL_1$, applies filter estimation within complexity profile CP3, and selects NCM to code the first EL $EL_1$ using AVC HP. ERPU2 pulls up the BL reconstructed picture to the second EL $EL_2$, applies filter estimation with complexity profile CP1, and selects BPM to code the second EL $EL_2$, using HEVC high efficiency (HE) configuration. The scalable bitstream is backward compatible with legacy MPEG-2 decoders. The ELs uses an AVC decoder or an HEVC decoder to generate the corresponding output. The first EL $EL_1$ uses an AVC decoder; the second EL $EL_2$ uses an HEVC decoder.

Figure 15:
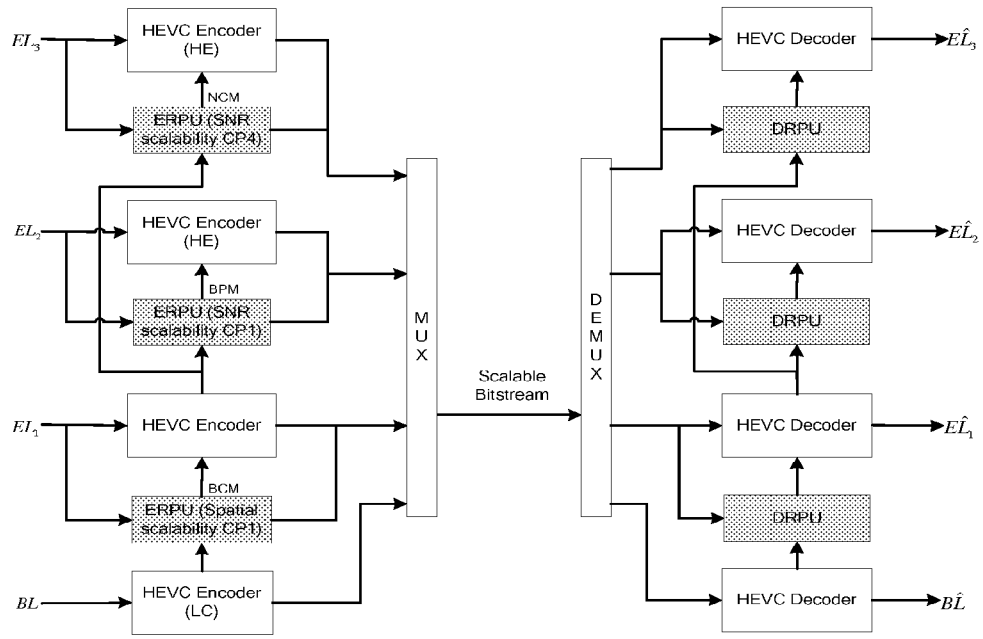
FIG. 15 depicts an example three HEVC layer system, according to an embodiment of the present invention.

An embodiment combines complexity scalability with other types of scalability. FIG. 15 depicts an example three HEVC layer system 1500, according to an embodiment of the present invention. In the three HEVC layer system 1500, each layer comprises an HEVC single layer. The BL is coded with an HEVC LC profile. The first EL $EL_1$ uses BCM; thus encoding for this layer is bypassed. The $EL_1$ uses BCM with an ERPU filter for spatial scalability. The complexity of the spatial scalability filter is set within the first complexity profile CP1, e.g., a one dimension (1D) fixed discrete cosine transform interpolation filter (DCT-IF). The second EL $EL_2$ is dependent on the first EL $EL_1$ with BPM, wherein the prediction is bypassed. The second EL $EL_2$ is coded with HEVC HE profile for signal-to-noise ratio (SNR) scalability. The $EL_2$ ERPU uses filter 'NULL', which is within the first complexity profile CP1 for SNR scalability. The third EL $EL_3$ is also dependent on the first EL $EL_1$ with NCM. The third EL $EL_3$ is coded with HEVC HE profile for SNR scalability. The $EL_3$ ERPU uses an 'explicit 2D' filter which is within CP4 for SNR scalability. Three HEVC layer system 1500 thus achieves complexity, spatial and SNR scalability.

Figure 16:
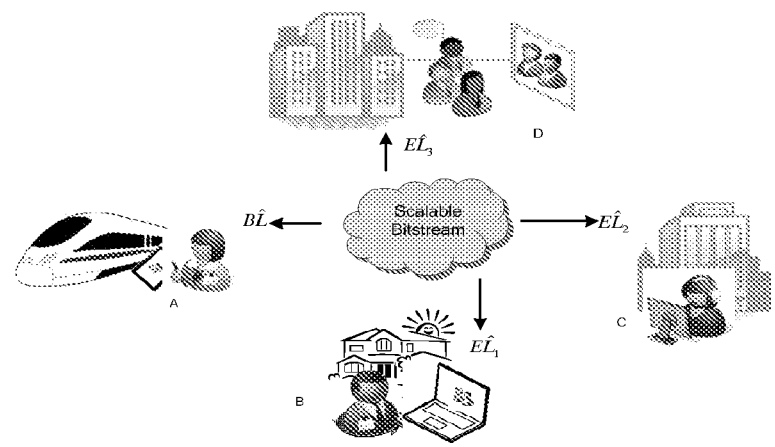
FIG. 16 depicts an example video broadcasting scheme, according to an embodiment of the present invention.

FIG. 16 depicts an example video broadcasting scheme, according to an embodiment of the present invention. A first user uses a mobile device A, e.g., while travelling. Mobile device A decodes the BL. A second user uses a laptop computer B, e.g., while working at home. The laptop B decodes the BL and EL1, which with spatial scalability, provides a larger output video than the mobile device A is capable of rendering. A third user uses a desktop PC C, e.g., while working in a satellite (or reduced amenity) office. PC C decodes the BL and the first and second ELs, $EL_1$ and $EL_2$. With a medium complexity level, PC C receives an output video that has the same resolution as the video received by laptop B. As the PC C provides SNR scalability, the video displayed therewith has a better quality (e.g., subjectively and/or objectively) than the video displayed on the laptop B. A fourth user uses a well-appointed PC, workstation or video conferencing system D, e.g., while working at a main (or enhanced amenity) office, a studio or a laboratory. Video conferencing system D decodes the BL, the first EL $EL_1$ and the third EL $EL_3$ with a degree of complexity that is higher than that of PC C or laptop B. Thus, system D renders an output video, which while having the same resolution as the video rendered by laptop B and PC C, exceeds the quality thereof. Thus, embodiments of the present invention provide a multi-layer scalable coding framework with complexity scalability.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to complexity scalable multilayer video encoding and decoding, such as those described herein. The computer and/or IC may compute any of a variety of parameters or values that relate to the complexity scalable multilayer video encoding and decoding as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement complexity scalable multilayer video encoding and decoding methods as described above by executing software instructions in a program memory accessible to the processors. An embodiment of the present invention may also be provided in the form of a program product. The program product may comprise any medium which carries a set of computer-readable signals comprising instructions which, when executed by a data processor, cause the data processor to execute a method of the invention. For instance, an embodiment of the present invention comprises a non-transitory computer-readable storage medium having stored thereon computer-executable instructions for executing a process that relates to complexity scalable multilayer video encoding and decoding. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to complexity scalable multilayer video encoding and decoding images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set as recited in Claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A multi-layer video system, comprising:
a base layer encoder that encodes a base layer of video information;
at least one enhancement layer encoder that encodes at least one enhancement layer of video information; and
an encoder side reference processing unit (RPU) that:
processes a current picture of an enhancement layer of the at least one enhancement layer based on a correlation between a base layer reconstructed reference picture and the current picture;
wherein
the correlation relates to a complexity characteristic that scaleably corresponds to the base layer reconstructed reference picture and the current picture,
the complexity characteristic comprising one of a plurality of complexity levels,
the encoder side RPU sends processed pictures to the enhancement layer and supports a plurality of complexity modes,
the plurality of complexity modes comprises:
a first complexity mode wherein processing of the current picture of the enhancement layer is bypassed,
a second complexity mode wherein processing of the current picture of the enhancement layer is based on a difference between an original enhancement layer picture and a filtered reconstructed base layer picture, and inter-prediction and intra-prediction in the enhancement layer are bypassed, and
a third complexity mode wherein processing of the current picture of the enhancement layer comprises a motion compensation loop in the enhancement layer,
a complexity mode of the plurality of complexity modes is selected based on complexity criteria, and
the first complexity mode has a lower complexity than the second complexity mode, and the second complexity mode has a lower complexity than the third complexity mode.

2. The system of claim 1, wherein the complexity criteria comprises a threshold of a fullness of a coding picture buffer.

3. The system of claim 2, wherein the first complexity mode is a bypass coding mode selected when the fullness of the coding picture buffer is below a coding picture buffer threshold.

4. The system of claim 1, wherein the complexity criteria comprises characteristics of a region of the current picture.

5. The system of claim 4, wherein the characteristics comprise motion content.

6. The system of claim 5, wherein if the motion content is above a motion content threshold, then the first complexity mode is utilized and if the motion content is below a motion content threshold, then the second complexity mode is utilized.

7. The system of claim 6, wherein the first complexity mode is a bypass coding mode and the second complexity mode is a bypass prediction mode.

8. The system of claim 4, wherein the characteristics comprise image texture.

9. The system of claim 8, wherein if the image texture is above an image texture threshold, then the first complexity mode is utilized and if the image texture is below an image texture threshold, then the second complexity mode is utilized.

10. The system of claim 9, wherein the first complexity mode is a bypass coding mode and the second complexity mode is a bypass prediction mode.

11. The system of claim 1, further comprising:
an output for a scalable video bitstream, the video bitstream being scalable in relation to one or more of:
spatial scalability;
temporal scalability;
quality scalability;
bit-depth scalability;
aspect ratio scalability;
view scalability;
chroma sampling scalability; or
color gamut scalability.

12. The system of claim 1, wherein the complexity criteria comprises a distortion associated with the original enhancement layer picture and the filtered reconstructed base layer picture, and the first complexity mode is selected if the distortion is less than a first threshold, the second complexity mode is selected if the distortion is less than a second threshold but greater than the first threshold, and the third complexity mode is selected if the distortion is greater than the second threshold.

13. The system of claim 1, wherein the encoder side reference processing unit comprises selectable complexity profiles having a plurality of complexity levels, each complexity profile comprising a plurality of filters.

14. The system of claim 13, wherein the plurality of filters comprise nearest neighbour filters, bilinear filters, AVC 6-tap filters, multi-tap filter, discrete cosine transform interpolation filter (DCT-IF), Lanczos filters, bicubic filters, spline filters, explicit two dimensional (2D) Weiner filters, inpainting filters, and super resolution filters.

* * * * *